(12) United States Patent
Beckman

(10) Patent No.: US 12,329,131 B2
(45) Date of Patent: Jun. 17, 2025

(54) SQUIRREL-PROOF BIRD FEEDER

(71) Applicant: Backyard Nature Products, LLC, Chilton, WI (US)

(72) Inventor: Ralph Beckman, Providence, RI (US)

(73) Assignee: Backyard Nature Products, LLC, Chilton, WI (US)

(*) Notice: Subject to any disclaimer, the term of this patent is extended or adjusted under 35 U.S.C. 154(b) by 21 days.

(21) Appl. No.: 18/194,314

(22) Filed: Mar. 31, 2023

(65) Prior Publication Data

US 2023/0309516 A1 Oct. 5, 2023

Related U.S. Application Data

(60) Provisional application No. 63/352,849, filed on Jun. 16, 2022, provisional application No. 63/326,037, filed on Mar. 31, 2022.

(51) Int. Cl.
*A01K 39/01* (2006.01)
*A01K 39/012* (2006.01)

(52) U.S. Cl.
CPC ........ *A01K 39/0113* (2013.01); *A01K 39/012* (2013.01)

(58) Field of Classification Search
CPC .......................... A01K 39/0113; A01K 39/012
See application file for complete search history.

(56) References Cited

U.S. PATENT DOCUMENTS

| | | | | |
|---|---|---|---|---|
| 3,568,641 | A * | 3/1971 | Kilham | A01K 39/012 D30/127 |
| 5,289,796 | A * | 3/1994 | Armstrong | A01K 39/012 119/59 |
| 5,937,788 | A * | 8/1999 | Boyd | A01K 39/0113 119/52.3 |
| 11,185,054 | B2 * | 11/2021 | Cote | A01K 39/01 |
| 11,213,018 | B2 * | 1/2022 | Bruno | A01K 39/0125 |
| 2014/0150725 | A1 * | 6/2014 | Moone | A01K 39/012 119/51.01 |
| 2022/0256816 | A1 * | 8/2022 | Woods | A01K 39/012 |
| 2022/0279762 | A1 * | 9/2022 | Cote | A01K 39/0113 |

* cited by examiner

*Primary Examiner* — Richard Green
*Assistant Examiner* — Nevena Aleksic

(57) ABSTRACT

A bird feeder and method of feeding wild birds are disclosed herein which thwarts squirrels, rodents, and other pests from accessing the bird feed. The bird feeder comprises a shutter mechanism which slides down a seed container to block access to the bird feed in an implementation. The shutter mechanism secures to the bottom of the seed container to maximize the containment volume of the feeder and to make cleaning the feeder easier. The shutter mechanism has adjustable spring force settings so that a user can set the spring force according to the type of predator. In an implementation, the shutter mechanism is rigged with a constant force spring which prevents partial deployment of the shutter.

20 Claims, 23 Drawing Sheets

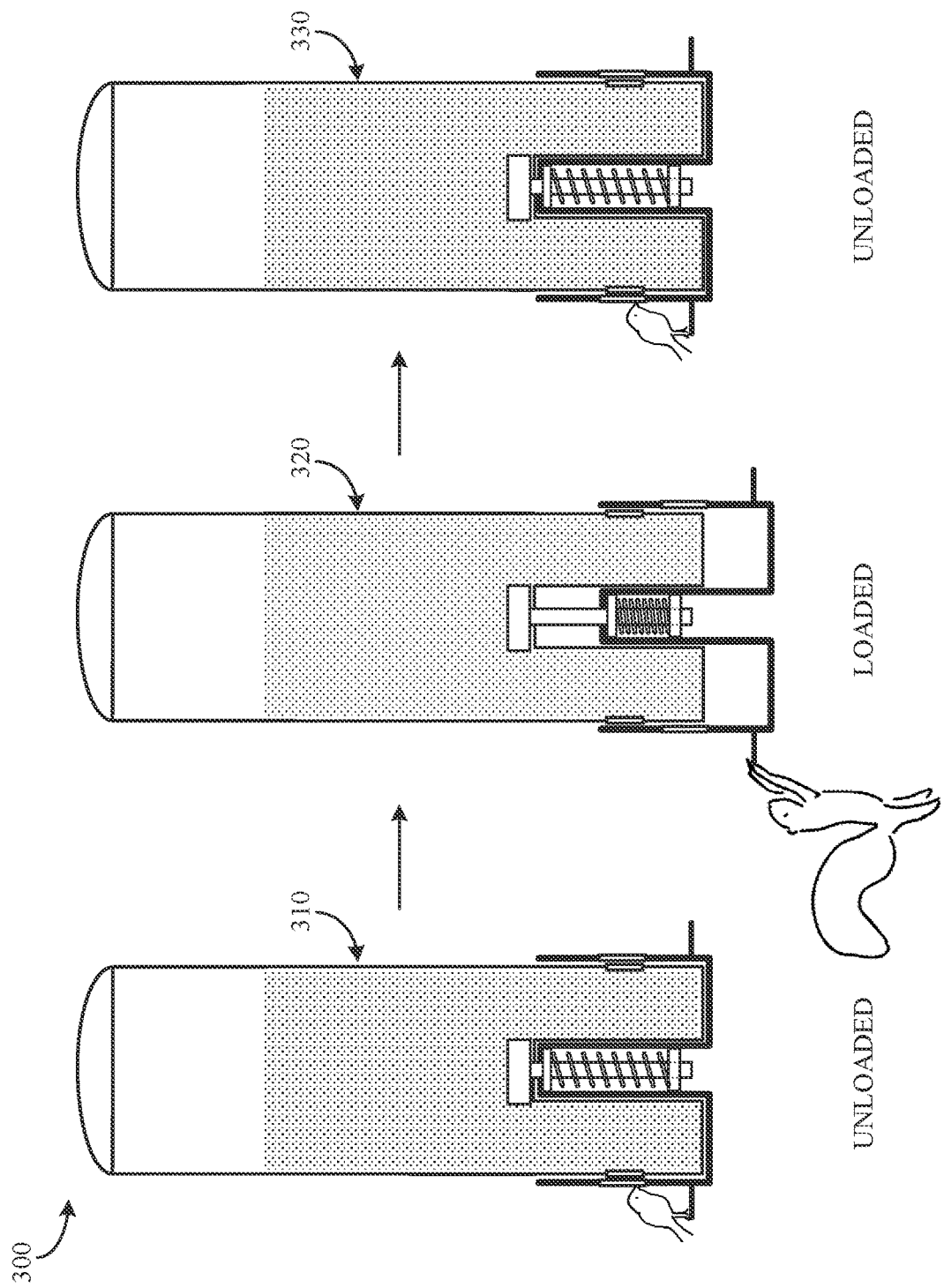

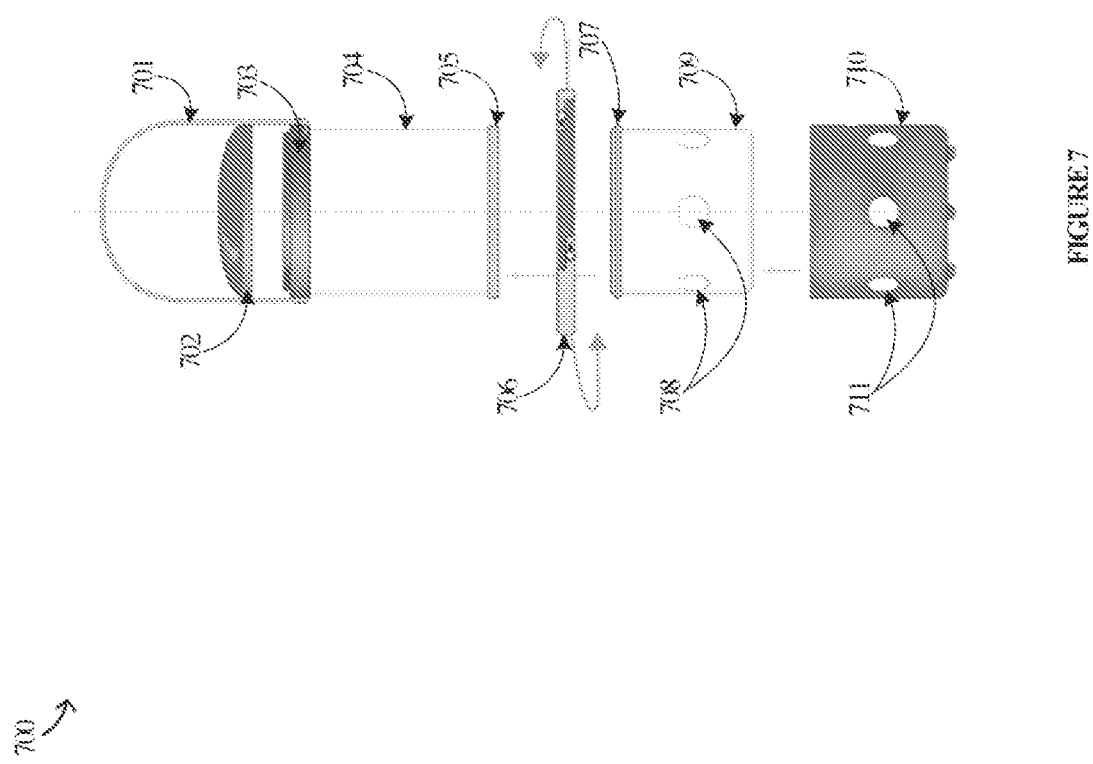

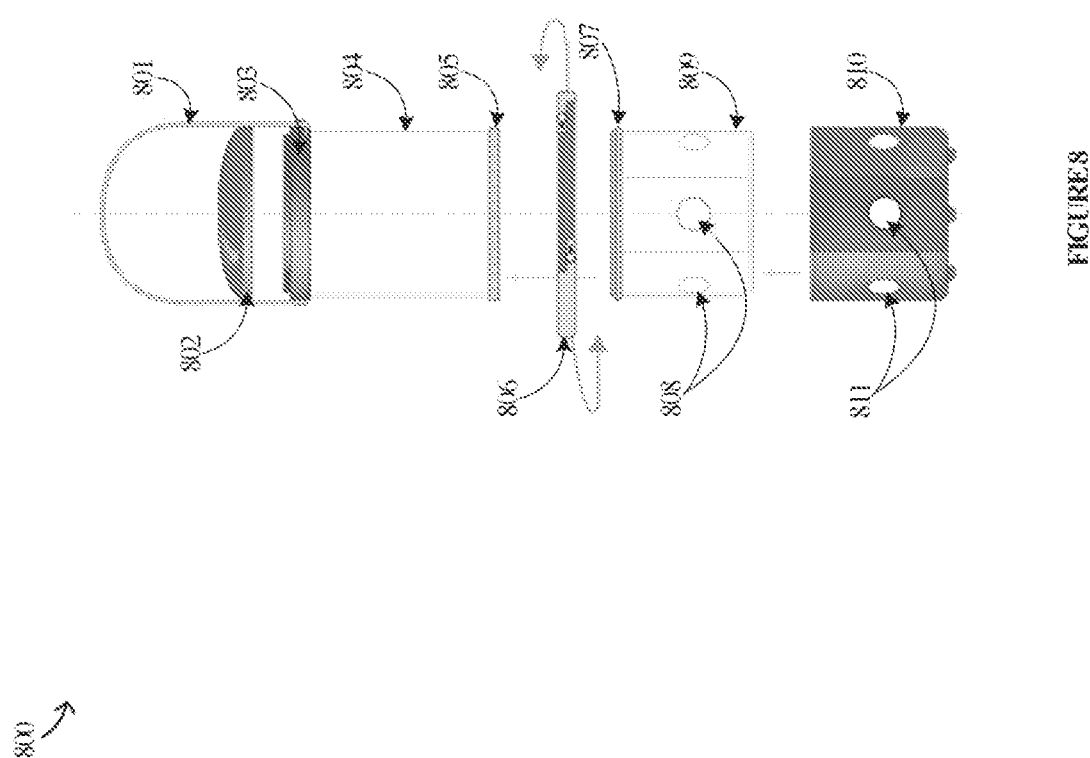

SQUIRREL-PROOF BIRD FEEDER

RELATED APPLICATIONS

This application is related to and claims the benefit of priority to U.S. Provisional Patent Application No. 63/326,037, entitled SQUIRREL-PROOF BIRD FEEDER, filed on Mar. 31, 2022, and to U.S. Provisional Patent Application No. 63/352,849, entitled SQUIRREL-PROOF BIRD FEEDER, filed on Jun. 16, 2022 the contents of which are hereby incorporated by reference in their entirety.

TECHNICAL FIELD

This technology relates generally to bird feeders which deny access by squirrels and other pests to the bird food.

BACKGROUND

From time immemorial, bird enthusiasts have waged a Cold War with squirrels, opportunistic marauders always on the hunt for a free meal. Bird enthusiasts have resorted to defensive activities such as trapping and deporting squirrels, greasing feeder hanging poles, or deploying dogs to guard their yards. Other, pacifist-leaning enthusiasts have gone the appeasement route, providing seed for both bird and squirrel in the hope of establishing a peaceful coexistence, but which increases the cost of feeding birds and runs the risk of attracting more squirrels and exacerbating the conflict.

In the realm of bird feeding devices, bird feeders may include mechanisms which leverage the greater weight of the squirrel (or of other interlopers like cats or bears) against them by spring-loading a sleeve to cover the seed ports or side walls of the feeder. However, these spring mechanisms takes up a substantial portion of the interior volume of the seed container which reduces how much seed the container can hold, resulting in the feeder having to be refilled more frequently. Refilling the feeder is also a more complicated task because the spring mechanism may have to be detached from the lid or because seed can fall into the spring mechanism as the seed container is filled which may impair the spring mechanism's ability to work correctly. Perhaps most importantly, these spring mechanisms also make cleaning the feeder more laborious as it is more difficult to reach the bottom of the feeder. Cleaning the feeder is important for sustaining a healthy bird population to avoid fostering an environment for pathogens to contaminate the bird feed.

Another difficulty with current spring-loaded designs is calibrating and adjusting the spring mechanism for the weight of the rodent or pest. When such an adjustment is available, it can be difficult to reach and turn. Moreover, setting the spring tension may be a matter of trial and error, and if the spring falls out of adjustment over time, this becomes an ongoing chore.

OVERVIEW

The technology disclosed herein describes a device and method for feeding birds while preventing squirrels and other rodents or pests from being able to get to the bird food. In an implementation, a seed container holding the bird food or bird seed has a bottom plate. From the bottom plate, an interior cylinder extends upward into the seed container a limited distance. The seed container also comprises one or more seed ports by which birds can get to the contents of the seed container.

Below the seed container is a shutter device comprising a base and a sleeve extending upward from the edge of the base which encloses a bottom portion of the seed container. The sleeve has access ports which, when the shutter device is in a resting or unloaded position, line up with the seed ports to allow access to the contents of the seed container. The shutter device also comprises a spring housing extending upward from the center of the base which is positioned within the interior cylinder.

Within the spring housing is a spring mechanism comprising at least a spring and a rod, the rod being fixedly attached at the top to the interior cylinder of the seed container. The spring is compressed which creates an upward force which holds the shutter mechanism in position against the bottom of the seed container. When a downward force is applied to the shutter device to overcome the spring force, the shutter device moves downward relative to the seed container, moving the access ports out of alignment with the seed ports and further compressing the spring within the spring mechanism. In the depressed or loaded position, the contents of the seed container are inaccessible from the seed ports.

In an implementation, the spring mechanism further comprises an adjustment knob for determining the amount of downward force which will cause the shutter device to move downward and block access to the seed ports. As the adjustment knob is turned, it adjusts the tension of the spring in discrete increments.

In an implementation, the spring comprises a constant-force spring, such that the shutter device remains in its resting or unloaded position until the downward force is sufficient to overcome the spring force, at which point the shutter device moves downward and fully closes off access to the seed ports.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple implementations are disclosed, still other implementations of the technology will become apparent to those skilled in the art from the following detailed description. As will be realized, aspects of the technology are capable of modifications, all without departing from the scope of the technology. Accordingly, the drawings and detailed description are to be regarded as illustrative in nature and not restrictive.

BRIEF DESCRIPTION OF THE DRAWINGS

FIG. 3 illustrates the operation of a squirrel-proof bird feeder in an implementation.

FIG. 7 illustrates an exploded view comprising the external components of a squirrel-proof bird feeder with a spring shutter mechanism in an implementation.

FIG. 8 illustrates an exploded view comprising the external components of a squirrel-proof bird feeder with a spring shutter mechanism in an implementation.

Figure 1:
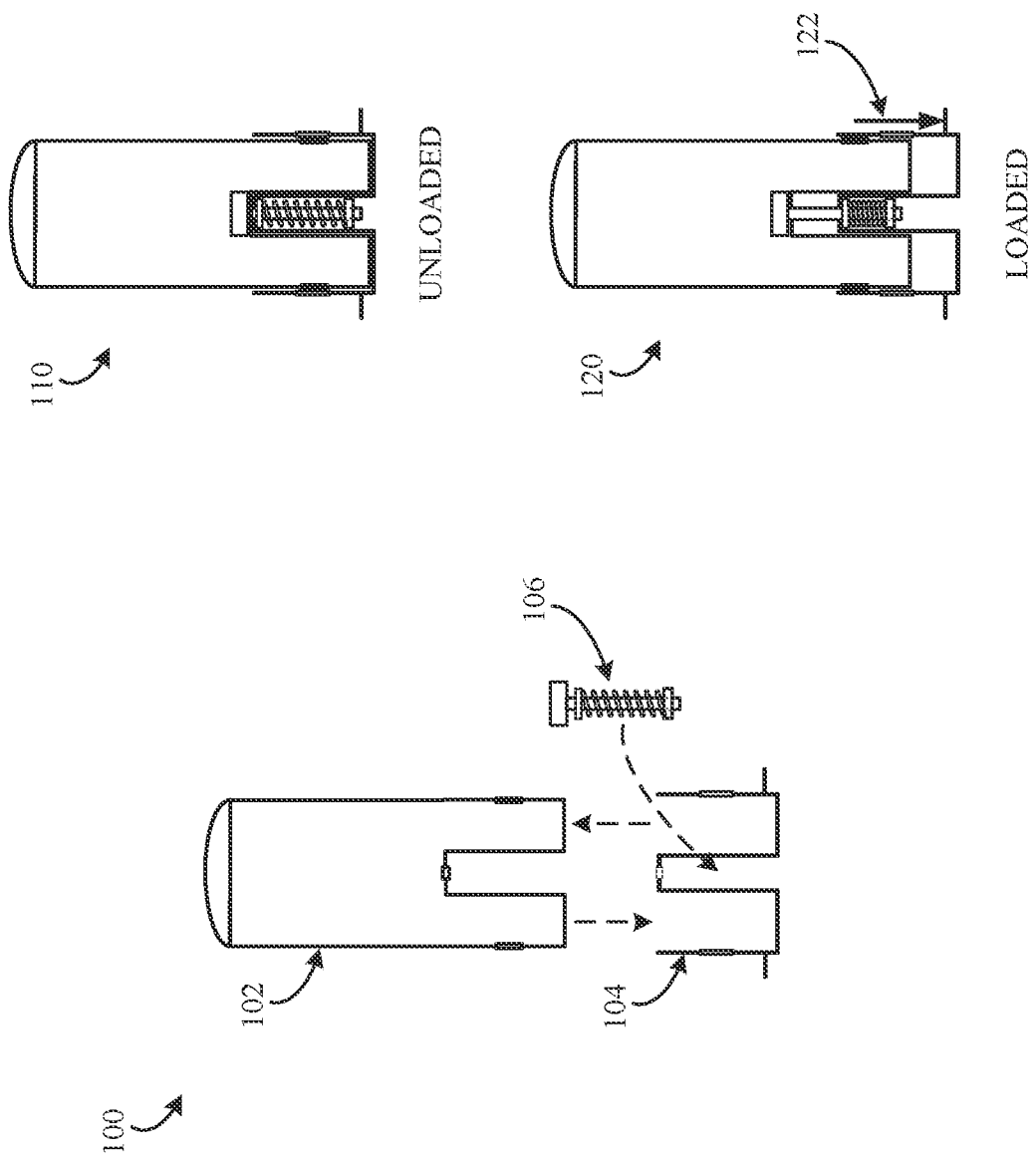
FIG. 1 illustrates a squirrel-proof bird feeder in an implementation.

The drawings have not necessarily been drawn to scale. Similarly, some components and/or operations may be separated into different blocks or combined into a single block for the purposes of discussion of some of the implementations of the present technology. Moreover, while the technology is amenable to various modifications and alternative forms, specific embodiments have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Implementations of the technology will now be described in detail with reference to several implementations illustrated in the accompanying drawings. In the following description, numerous specific details are set forth in order to provide a thorough understanding of implementations of the technology. It will be apparent, however, to one skilled in the art, that implementations may be practiced without some or all of these specific details. In other instances, well known process steps and/or structures have not been described in detail in order to not unnecessarily obscure the technology. The features and advantages of implementations may be better understood with reference to the drawings and discussions that follow.

Aspects, features and advantages of exemplary implementations will become better understood with regard to the following description in connection with the accompanying drawings. It should be apparent to those skilled in the art that the described implementations are illustrative only and not limiting, having been presented by way of example only. All features disclosed in this description may be replaced by alternative features which serve the same or similar purpose, unless expressly stated otherwise. Therefore, numerous other implementations of the modifications thereof are contemplated as falling within the scope of the technology as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the technology as the implementations disclosed herein are merely exemplary.

The technology described herein discloses a bird feeder and a method of feeding birds which allows access to the bird food by wild birds, but denies access to the bird food by predators such as squirrels, rodents, or other pests by virtue of their heavier weight triggering a spring-rigged shutter mechanism which descends and blocks the seed ports. Predators can also include larger bird species. In an implementation, the spring-rigged shutter mechanism is adjusted in discrete, quantifiable increments allowing for precise, repeatable control over when access to the food is blocked according to the weight of the predators. In an implementation, the spring-rigged shutter mechanism uses a constant force spring to avoid partially deployment of the shutter, that is to say, so that the ports through which food is accessed are not partially blocked which can create a hazard for birds and predators.

FIG. 1 illustrates various views of a spring-rigged squirrel-proof bird feeder in an implementation. Bird feeder 100 illustrates the components of a bird feeder comprising seed container 102, shutter device 104, and spring mechanism 106. Seed container 102 is typically a cylindrical device of circular or hexagonal cross section. Those accustomed to working in the art will recognize that other cross-sectional shapes will be suitable as well. Seed container 102 has a removeable lid which secures to the top to protect the contents (e.g., bird feed) from precipitation. Seed container 102 is typically made of a transparent material such as Lexan® or other polycarbonate. Near the bottom of seed container 102 are multiple seed ports by which birds can access the bird feed. The bottom of seed container 102 is closed with a flat surface from which an interior cylindrical cavity extends upward into the interior volume of seed container 102. The interior cylindrical cavity extends a limited distance into the interior volume. That the interior cylindrical cavity extends only part-way into the interior volume provides important advantages: seed container 102 can hold more bird feed and seed container 102 is easier to clean.

Continuing with FIG. 1, shutter device 104 covers the bottom portion of seed container 102, conforming to the shape of seed container 102. Shutter device 104 comprises a sleeve with multiple access ports which align with the seed ports of seed container 102 in an unloaded configuration. Shutter device 104 also comprises a second cylindrical cavity which fits snugly within the interior cylindrical cavity of seed container 102. Shutter device 104 also comprises, in an implementation, one or more perches attached to the sleeve below the access ports. Spring mechanism 106 fits inside the second cylindrical cavity of shutter device 104 but attaches to the top of the interior cylindrical cavity of seed container 102. Spring mechanism 106 controls the position of shutter device 104 so that shutter device 104 can move relative to seed container 102 from an unloaded position to a loaded position and back again.

View 110 illustrates bird feeder 100 in an unloaded configuration. In the unloaded configuration, spring mechanism 106 pushes shutter device 104 up against the bottom of seed container 102 so that the access ports of spring mechanism 106 align with the seed ports of seed container 102. With the ports aligned, birds can freely access the bird feed in seed container 102.

View 120 illustrates bird feeder 100 in a loaded configuration. In the loaded configuration, downward force 122 applied to shutter device 104 overcomes the spring force of spring mechanism 106, and shutter device 104 moves to a position below seed container 102. Downward force 122 must be sufficient to overcome the spring force of spring mechanism 106 to push shutter device 104 downward. When positioned below seed container 102, the access ports of shutter device 104 are no longer aligned with the seed ports, blocking access to the bird feed in seed container 102. In an implementation, spring mechanism 106 further comprises a travel limiter which prevents shutter device 104 from being pushed so far down as to uncover the seed ports of seed container 102. In an implementation, the spring force of spring mechanism 106 is adjustable by rotating a knob which adjusts the spring force in discrete increments. In an implementation, spring mechanism 106 is enabled by a constant force spring which prevents shutter device 104 from sliding only partially and only partially blocking the seed ports of seed container 102.

Downward force 122 would be provided by a predator such as a squirrel grabbing onto and hanging off of a perch attached to shutter device 104. The spring force of spring mechanism 106 can be selected or adjusted to according to the anticipated weight of the predators. Upon removal of downward force 122 (e.g., the squirrel, thwarted by the blocked access, leaves), spring mechanism 106 pushes shutter device 104 back into the unloaded configuration, and the bird feed is once again available to birds.

In an implementation, the sleeve of shutter device 104 is long enough to cover most or all of the exterior of seed container 102.

Figure 2:
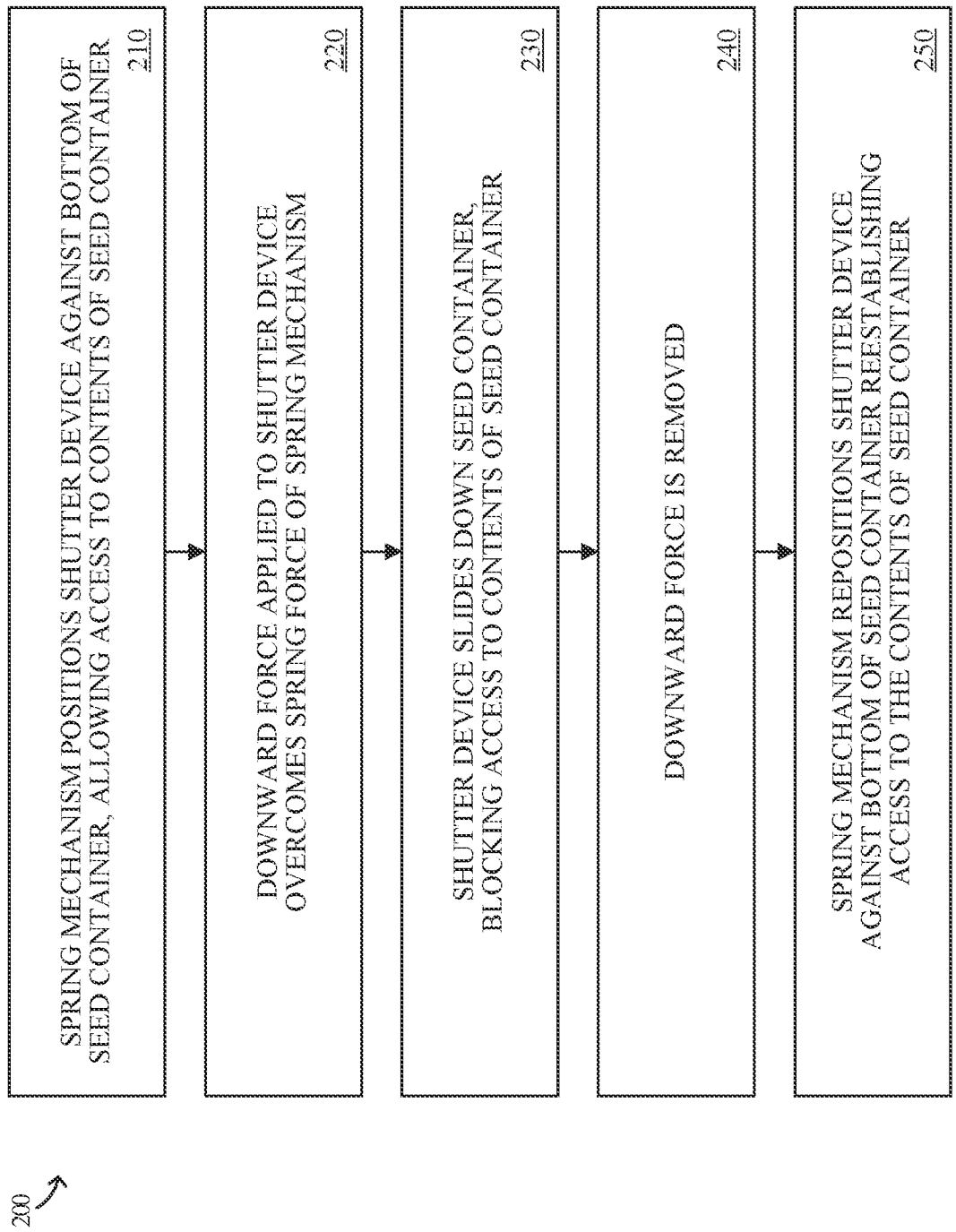
FIG. 2 illustrates a method of operation of a squirrel-proof bird feeder in an implementation.

FIG. 2 illustrates process 200 of operation for a squirrel-proof bird feeder. Process 200 will be described in terms of the components of FIG. 1, although other elements discussed herein can instead be employed. A squirrel-proof bird feeder such as the bird feeder of view 110 is in an unloaded configuration, which is to say that shutter device 104 is pushed up against the bottom of the bird feeder and the contents of the seed container 102 are available through the aligned access and seed ports (step 210). When a predator grabs onto shutter device 104, perhaps by grabbing onto a perch, the weight of the predator overcomes the spring force of spring mechanism 106 (step 220), causing shutter device 104 to slide down seed container 102 (step 230). With the bird feeder in the loaded configuration as illustrated in view 120, access to the bird feed is blocked. When the predator leaves, spring mechanism 106 pushes shutter device 104 back into the unloaded position (step 240). With the bird feeder in the unloaded configuration (e.g. as in view 110), the access and seed ports are re-aligned and birds can once again feed from the bird feeder (step 250).

FIG. 3 illustrates environmental view 300 of the operation of a squirrel-proof bird feeder in an implementation. The bird feeder comprises a seed container, shutter device, and spring mechanism, contains bird feed. The shutter device conforms closely to the external profile of the seed container so that there are no gaps into which bird feed or other debris can fall. In the implementation shown, birds can feed from the bird feeder using a perch attached to the shutter device. In unloaded configuration 310, the shutter device of the bird feeder is pushed up against the seed container with no gap between them, the access ports and seed ports are aligned, and wild birds can feed from the feeder. The weight of the birds is not sufficient to overcome the spring force of the spring mechanism. Next, a squirrel grabs onto a perch attached to the shutter device. In loaded configuration 320, the weight of the squirrel overcomes the spring force of the spring mechanism, causing the shutter device to move downward. In an implementation, the spring mechanism comprises an adjustment to control how much weight will move the spring mechanism to the loaded configuration. Alternatively, the spring mechanism may comprise a constant force spring which prevents partial blockage of the seed port. In loaded configuration 320, the access and seed ports are out of alignment, so the squirrel is blocked from accessing the bird feed. Thwarted in its attempt to get to the bird feed, the squirrel departs, causing the bird feeder to reposition to unloaded configuration 330, in which the bird feed is again available to the birds.

Figures 4A, 4B:
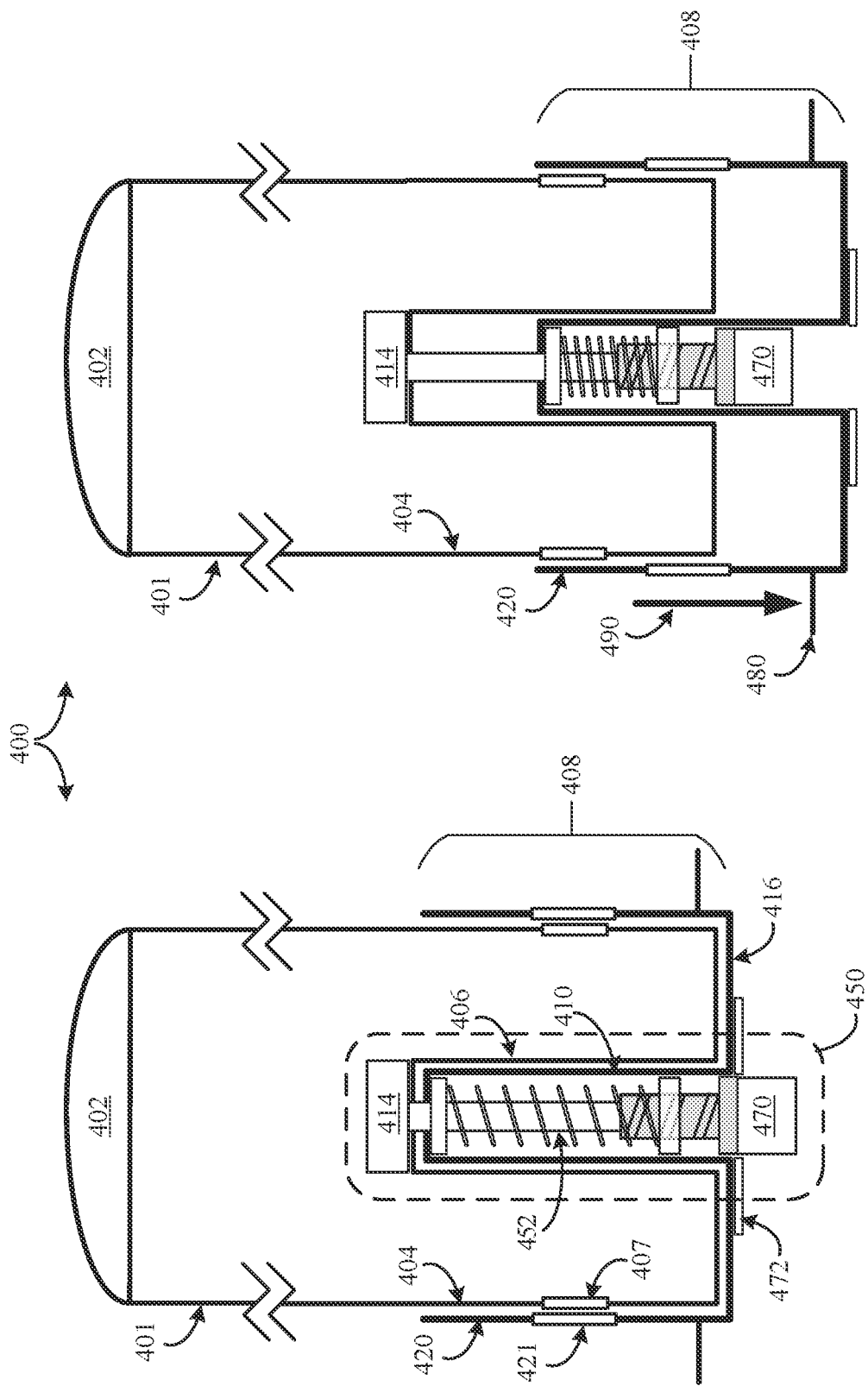
FIGS. 4A and 4B illustrate a squirrel-proof bird feeder with an adjustable spring shutter mechanism in an implementation.

FIGS. 4A and 4B illustrate bird feeder 400, an adjustable spring-rigged squirrel-proof bird feeder, in an implementation. FIG. 4A depicts bird feeder 400 in an unloaded position, while FIG. 4B depicts bird feeder 400 in a loaded position, that is, with downward force 490 causing shutter 408 to slide down and cover seed ports 407, blocking access to the bird feed within.

Bird feeder 400 holds bird food such as small nuts, bird seed, or other types of granular bird feed. In FIGS. 4A and 4B, seed container 401 comprises a cylinder which is closed at the bottom and capped off at the top with removeable lid 402 or cover secured to the top. The cylinder may comprise a circular, hexagonal, or other cross-sectional shape. Seed container 401 may be made of a transparent, weather-resistant material such as Lexan® or other polycarbonate material. Lid 402 engages seed container 401 in a manner that ensures a weather-tight seal, for example, lid 402 may be screwed onto seed container 401. The length of seed container 401 will determine, of course, how much bird food that bird feeder 400 can hold, which in turn relates to how often it will need to be refilled. Lid 402 may also comprise a handle (not shown) by which bird feeder 400 is suspended. Alternatively, the handle may be attached directly to seed container 401.

Bottom section 404 of seed container 401 comprises the lower portion of seed container 401, enclosing the bottom of seed container 401, and interior cylinder 406 which protrudes into the interior of seed container 401, the extent of the protrusion into seed container 401 being a limited distance to maximize the useable volume of bird feeder 400 and as well as to make bird feeder 400 easier to clean. This limited distance may be, for example, less than half the length of seed container 401, such as one-third or one-half the length of seed container 401, such that at least half the seed container is unencroached by interior cylinder 406. For example, seed container 401 may be at least eight inches tall with interior cylinder 406 encroaching only two to three inches within.

The walls of seed container 401 have multiple seed ports 407 situated along the outer cylindrical wall of bottom section 404 by which birds (and squirrels) can reach the seed. The size of seed ports 407 will depend on the type of seed used in the feeder as well as the type of bird which will be using the feeder. Seed container 401 may also comprise an awning (not shown) or larger diameter lid extending over seed ports 407 to prevent precipitation from getting into the seed and causing the seed to rot or mold.

Shutter 408 is seated below bottom section 404 and conforms to the shape of bottom section 404. Shutter 408 comprises cylindrical sleeve 420 which encases the cylindrical wall of bottom section 404. Sleeve 420 has multiple access ports 421 which align with seed ports 407 when bird feeder is in a unloaded position (as in FIG. 4A). Shutter 108 moves relative to bottom section 404 as illustrated in FIG. 4B when, for example, force 490 (e.g., the weight of a squirrel) pushes against one or more of perches 480 which are attached to sleeve 420. In an alternative implementation, sleeve 420 has multiple small holes or indentations, rather than perches, for birds to grab onto to feed (and which squirrels can also grab onto). Shutter 408 may also comprise multiple drainage holes in bottom face 416 to prevent water from accumulating and fostering a moist environment, which hastens seed decay.

Shutter 408 also comprises spring cylinder 410 which extends upward from bottom face 416 and fits into interior cylinder 406. Spring cylinder 410 houses spring assembly 450 which attaches to the top face of interior cylinder 406. This attachment includes rod 452 which passes through a hole at the top of spring cylinder 410, through a second hole at the top of interior cylinder 406 and is secured to bottom section 404 by screwing into endcap 414. At the bottom of rod 452 is tension adjustment knob 470 by which the spring tension of spring assembly 450 can be adjusted. To adjust the spring tension, tension adjustment knob 470 is rotated with respect to angular position markings on dial 472 an implementation of which is illustrated by dial 957 in FIG. 9A.

Figure 5B:
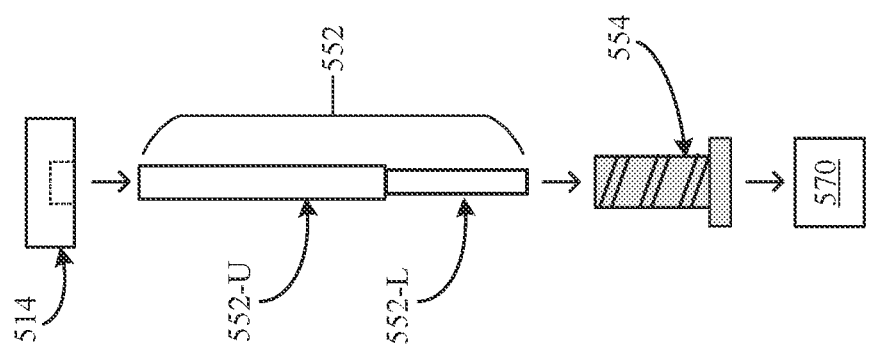
FIGS. 5A and 5B illustrate a spring shutter mechanism for a squirrel-proof bird feeder in an implementation
Figure 5A:
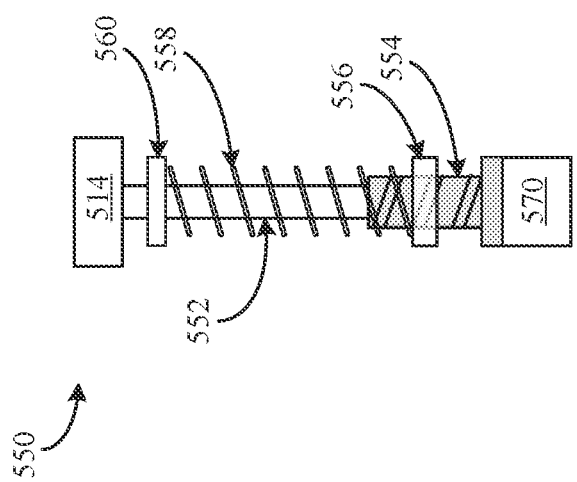

FIGS. 5A and 5B illustrate spring mechanism 550 in an implementation. Rod 552 of spring mechanism 550, extending from endcap 514, has upper section 552-U and lower section 552-L, wherein the diameter of upper section 552-U is slightly larger than the diameter of lower section 552-L. Lower section 552-L of rod 552 passes through adjustment barrel 554, the diameter of which is sized smaller than the diameter of upper section 552-U to keep it in position around lower section 552-L. A pin (not shown) inserted crosswise through rod 552 keeps adjustment barrel 554 secured to rod 552 at the bottom. Adjustment barrel 554 is reverse- or left-handed threaded with coarse threads. Around adjustment barrel 554 is adjustment nut 556 which has interior protrusions to engage the coarse threads. Adjustment nut 556 also has one or more grooves running the length of its outer surface which prevent it from rotating within spring mechanism 550. Thus, when adjustment barrel 554 is rotated, this drives adjustment nut 556 to travel up and down adjustment barrel 554, which in turn adjusts the length (and therefore spring force) of spring 458. Spring 458 comprises a helical coil spring. Spring mechanism 550 may also comprise a travel limiter (not shown) which limits the distance the shutter, such as shutter 408 of FIG. 4, travels downward when subjected to force 590.

Rod 552 and adjustment barrel 554 are positioned within spring 558. The top of spring 558 rests against top nut 560 which in turn rests against the bottom side of the top of spring cylinder 510. The bottom of spring 558 rests against adjustment nut 556. When the bird feeder is in an unloaded position, spring 558 is slightly compressed, which causes shutter 408 to be firmly seated against bottom section 504. When adjustment barrel 554 is rotated, the up-and-down travel of adjustment nut 556 adjusts the length of spring 558, which in turn adjusts the spring force. For example, when adjustment nut 556 is positioned at the top of adjustment barrel 554, spring 558 is the most compressed (in the unloaded configuration), and its spring force is greatest. Conversely, when adjustment nut 556 is positioned at the bottom of adjustment barrel 554, spring 558 is least compressed and its spring force is least.

At the bottom of rod 552 in spring mechanism 550, a pin (not shown) inserted crosswise through rod 552 keeps adjustment barrel 554 secured to it. Below that, knob 570 is attached to the bottom of adjustment barrel 554. In this way, when force 590 overcomes the spring force of spring 558, shutter 408 is pushed downward, as illustrated in FIG. 4B. Specifically, the top of spring cylinder 510 slides down rod 552, pushing top nut 560 downward which compresses spring 558 against adjustment nut 556. When force 590 is no longer applied, spring 558 pushes shutter 408 back into its unloaded position, and the seeds are once again available to the birds.

In an implementation, spring 558 is adjusted in discrete increments, which enables the user to determine the appropriate spring force according to the type of predator the user wants to thwart while still allowing desirable bird species access to the feed. The discrete adjustment provides a means of quantifying the spring force so the adjustment process is not done blindly or haphazardly and makes the adjustment reproducible in other feeders of this type. In an implementation, knob 570 may be rotated to one of six positions as indicated on dial 572. When a user turns knob 570 to adjust the force of spring 558, knob 570, which is connected to adjustment barrel 554, causes adjustment barrel 554 to rotate around rod 552. Rotating knob 570 clockwise, for example, drives adjustment nut 556 to travel upward, compressing spring 558 and increasing its force, i.e., more weight is required to overcome the spring force. The six dial positions are defined by a small pin (not shown) inserted crosswise through rod 552 which seats into one of multiple radial detents (not shown) at the bottom of adjustment barrel 554, each detent corresponding to one of the six dial positions on dial 572. As the pin rotates into and out of a radial detent, this also provides haptic feedback to the user making the adjustment.

Figure 6B:
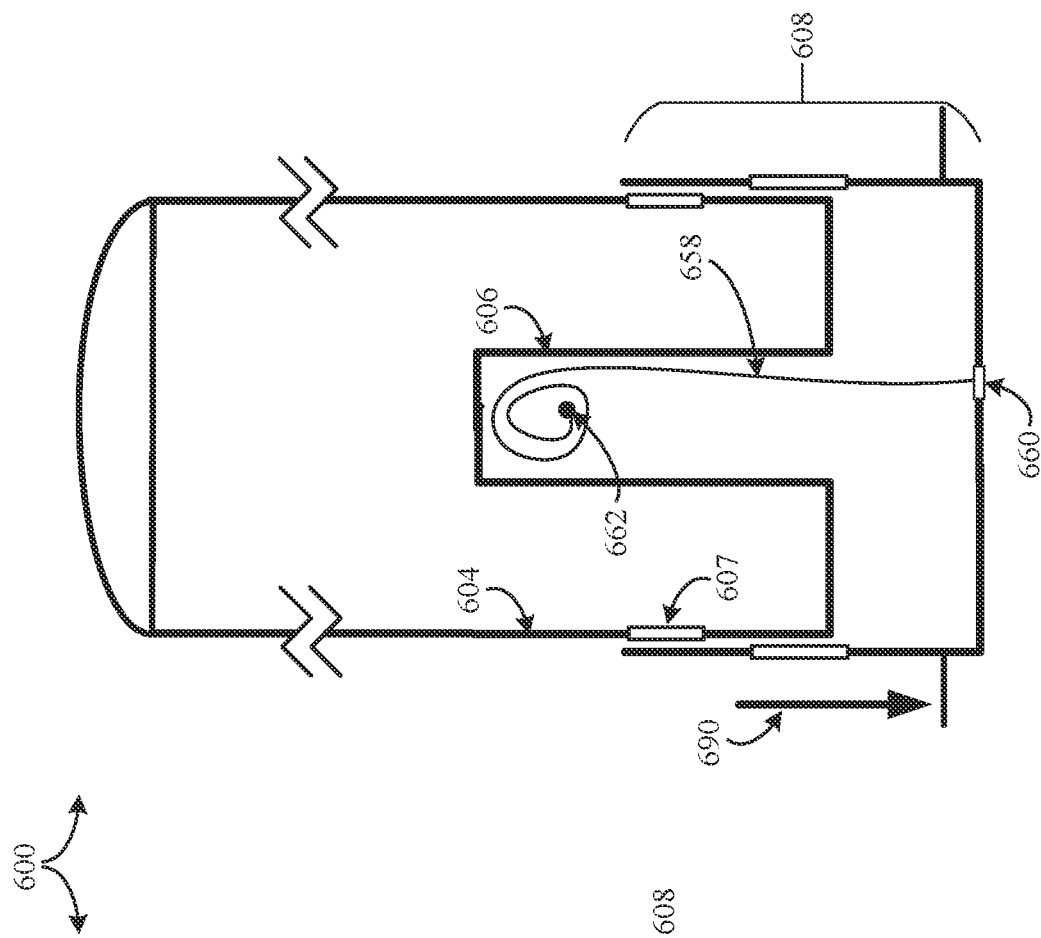
FIGS. 6A and 6B illustrate a squirrel-proof bird feeder with a constant-force spring shutter mechanism in an implementation.
Figure 6A:
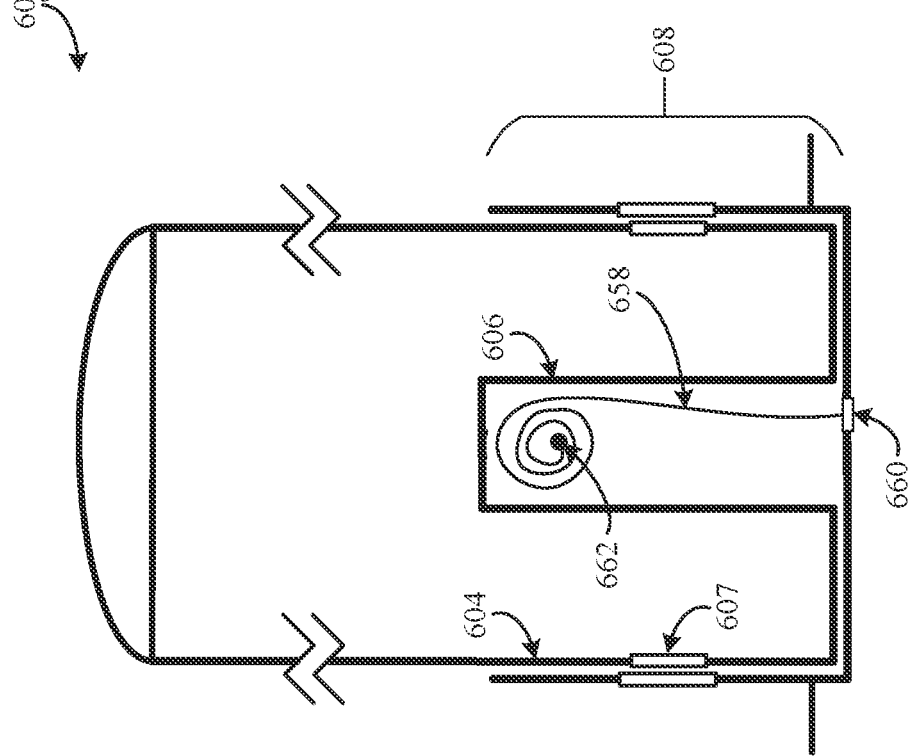

FIGS. 6A and 6B illustrate squirrel-proof bird feeder 600 with a constant force spring in an implementation. Bird feeder 600 comprises a seed container body similar to bird feeders 100 but is configured with constant force spring 658, a ribbon-coil type of spring. Constant force spring 658 provides the same spring force for any amount of extension, in contrast to bird feeder 100 where the spring force varies with the length of spring 158. The coil of constant force spring 658 attaches to the inside of interior cylinder 606 of bottom section 604 at attachment point 662. Shutter 608 has a flat bottom to which constant force spring 658 attaches at attachment point 660.

In an implementation, constant force spring 658 is selected based on the force at which a user would want shutter 608 to block seed ports 607, i.e., the weight of a squirrel. By its nature, the action of shutter 608 with constant force spring 658 is binary. Constant force spring 658 will hold shutter 608 up so seed ports 607 are not blocked, but when the squirrel grabs onto shutter 608 and hangs off it, the squirrel's weight will overcome the spring force of constant force spring 658, causing shutter 608 to slide down and close off access to seed ports 607. Thus, constant force spring 658 prevents partial movement of shutter 208 when downward force 690 is not enough to fully overcome the spring force. If the squirrel weighs less than the force needed to overcome the spring force, shutter 608 does not move at all. This can prevent injuries to birds or other animals that might occur if shutter 608 moves slightly downward but without fully blocking access to the seed.

FIG. 7 illustrates an exploded view of squirrel-proof bird feeder 700 with an spring-actuated shutter mechanism in an implementation. Bird feeder 700 comprises detachable lid 702 which attaches to seed container 704 by engaging lid collar 703 at the top of seed container 704. Handle 701 attaches to seed container 704 so that bird feeder 700 can be hung. Handle 701 may have an adjustable length to control how high or low bird feeder 700 hangs from the point of suspension. Bird feeder 700 further comprises spring clamp 706 by which bottom section 709 attaches to seed container 704 by engaging top flange 705 and bottom flange 707. Bird feeder 700 further comprises shutter 710. Shutter 710 slides up and down relative to bottom section 709 with seed ports 708 and access ports 711 in horizontal alignment. In various implementations, shutter 710 may be operatively coupled to an adjustable force spring mechanism or constant force spring mechanism.

FIG. 8 illustrates squirrel-proof bird feeder 800 in an implementation similar to bird feeder 700. Bird feeder 800 comprises shutter 810 and bottom section 809 each with a hexagonal cross-sectional shape. By conforming shutter 810 to the shape of bottom section 809, this ensures that seed ports 808 and access ports 811 are always horizontally aligned as shutter 810 to slides up and down relative to bottom section 809.

Figure 9B:
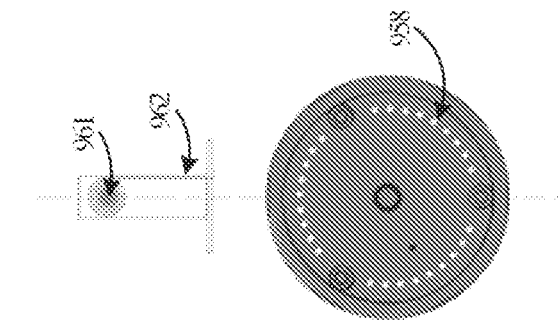
FIGS. 9A and 9B illustrate bottom views of an adjustable squirrel-proof bird feeder and of a constant-force squirrel-proof bird feeder in various implementations.
Figure 9A:
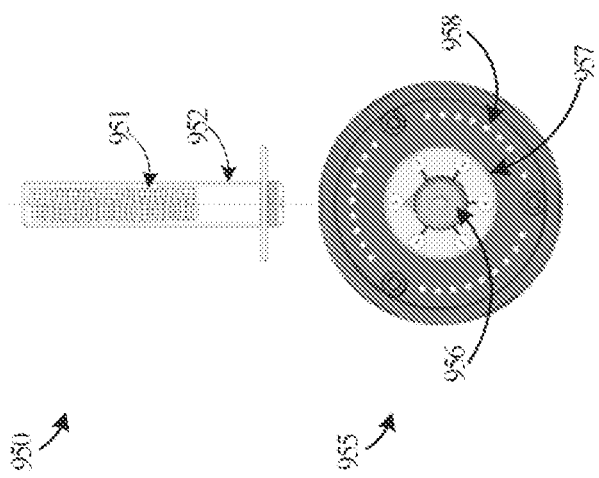

FIG. 9A illustrates a cross-sectional view of spring mechanism 950 and upward view of shutter 955 at the bottom of a squirrel-proof bird feeder in an implementation. Spring mechanism 950 comprises spring 951, the tension of which is adjusted by adjusting its compressed length. Spring 951 is housed within spring cylinder 952 which moves up and down as force is applied to spring mechanism 950. On the bottom of shutter 955, adjustment knob 956 rotates to one of six positions marked on dial 957. Each position corresponds to a compressed length of spring 951 and therefore to the tension of spring 951. In this way, a user can adjust the force required to close the feeder according to the type (i.e., weight) of the predator. Shutter 955 further comprises small holes 958 for drainage to prevent a build-up of moisture between shutter 655 and the bottom of the seed container.

FIG. 9B illustrates a cross-sectional view of spring mechanism 960 and upward view of shutter 965 of a squirrel-proof bird feeder in an implementation. Spring mechanism 960 comprises constant force spring 961 within interior cylinder 962 at the bottom of the seed container (not shown). Constant force spring 961 attaches to shutter 965 such that when sufficient downward force is applied to shutter 965, shutter 965 drops down, blocking access to the seed ports (not shown). Constant force spring 961 operates in a binary way: the seed ports are either fully accessible (e.g. when the weight of the squirrel is not sufficient to overcome the spring force) or fully closed off (e.g. when the weight of the squirrel overcomes the spring force). In this way, shutter 965 will not be partially displaced if the weight is close to but does not overcome the spring force, which could trap the claw of a bird or a predator. Shutter 965 further comprises small holes 958 for drainage.

Figure 10:
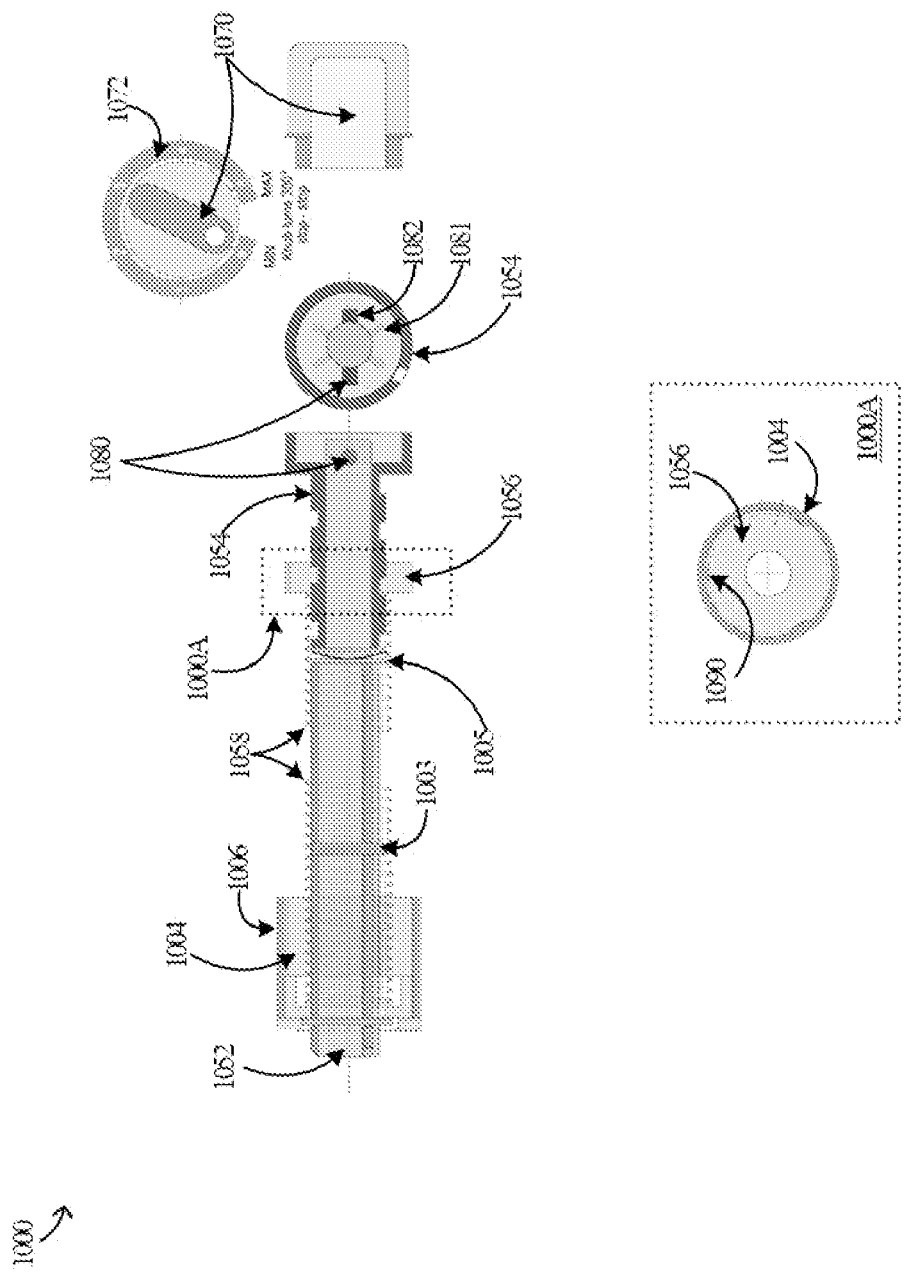
FIG. 10 illustrates an exploded view of an adjustable spring shutter mechanism of a squirrel-proof bird feeder in an implementation.

FIG. 10 illustrates a sideways exploded view of an adjustable spring mechanism 1000 of a bird feeder in an implementation. Spring mechanism 1000 comprises spring cylinder 1004 within interior cylinder 1006. Spring cylinder 1004 slides out of interior cylinder 1006 when the sleeve (such as sleeve 420 of FIG. 4) moves from an unloaded to a loaded position. Adjustable spring mechanism 1000 further comprises travel limiter 1003 which limits the distance spring cylinder 1004 can slide out of interior cylinder 1006. In an implementation, when a large force is applied (such as force 190 of FIG. 1B), the system depresses the shutter while travel limiter 1003 keeps the shutter from descending too far below the bottom of the seed container. Thus, travel limiter 1003 determines the maximum distance the shutter is allotted to depress. Adjustable spring mechanism 1000 further comprises rod 1052 which is initially fixed into an endcap system such as the endcap embodiments that will be later described in FIG. 11. Rod 1052 then extends through the entire adjustable spring mechanism system and finally secures into knob 1070. Rod 1052 travels through spring 1058, wherein spring 1058 extends until adjustment nut 1056, wherein adjustment nut 1056 is threaded onto adjustment barrel 1054 wherein adjustment barrel 1054 is anchored to the end of rod 1052 by pin 1080. This system is controlled by knob 1070, which is secured to adjustment barrel 1054. In an implementation, if the user rotates knob 1070 to a setting as indicated by dial 1072, then this directly corresponds with the adjustment of pin 1080 from radial detent 1082, to empty radial detent 1081. This action further results in the rotation of both rod 1052 and adjustment barrel 1054 as they have been fixed to one another via pin 1080. This will drive adjustment nut 1056 either up or down adjustment barrel 1054, wherein the direction is dependent on the adjustment made by the user.

Continuing with FIG. 10, in an implementation, dial 1072 indicates six settings correlating to six different system sensitivities, wherein the minimum setting is most sensitive to an applied force and the maximum setting is least sensitive to an applied force. Thus, the "$0^{th}$ setting" (or the minimum setting) requires the least amount of weight to depress the shutter and deny access to the contents within the feeder, while the "$5^{th}$ setting" (or the maximum setting) requires the most amount of weight to depress the shutter and deny access to the contents within the feeder. Therefore, the minimum setting corresponds to the situation wherein adjustment nut 1056 is at the bottom of adjustment barrel 1054, thus maximizing the spring length which decreases the spring forces resulting in an increase in the overall system sensitivity. While the maximum setting corresponds to the situation wherein adjustment nut 1056 is at the top of adjustment barrel 1054 thus minimizing the spring length which increases the spring force resulting in a decrease in the overall system sensitivity. Thus, the user can discretely adjust knob 1070 to the setting which will best satisfy their needs. Adjustable spring mechanism 1000 further comprises curved spring shim 1005 which is positioned at the top of adjustment barrel 1054 wherein curved spring shim 1005 helps position adjustment barrel 1054, while enhancing the rotational movement of the adjustment system.

Figure 11:
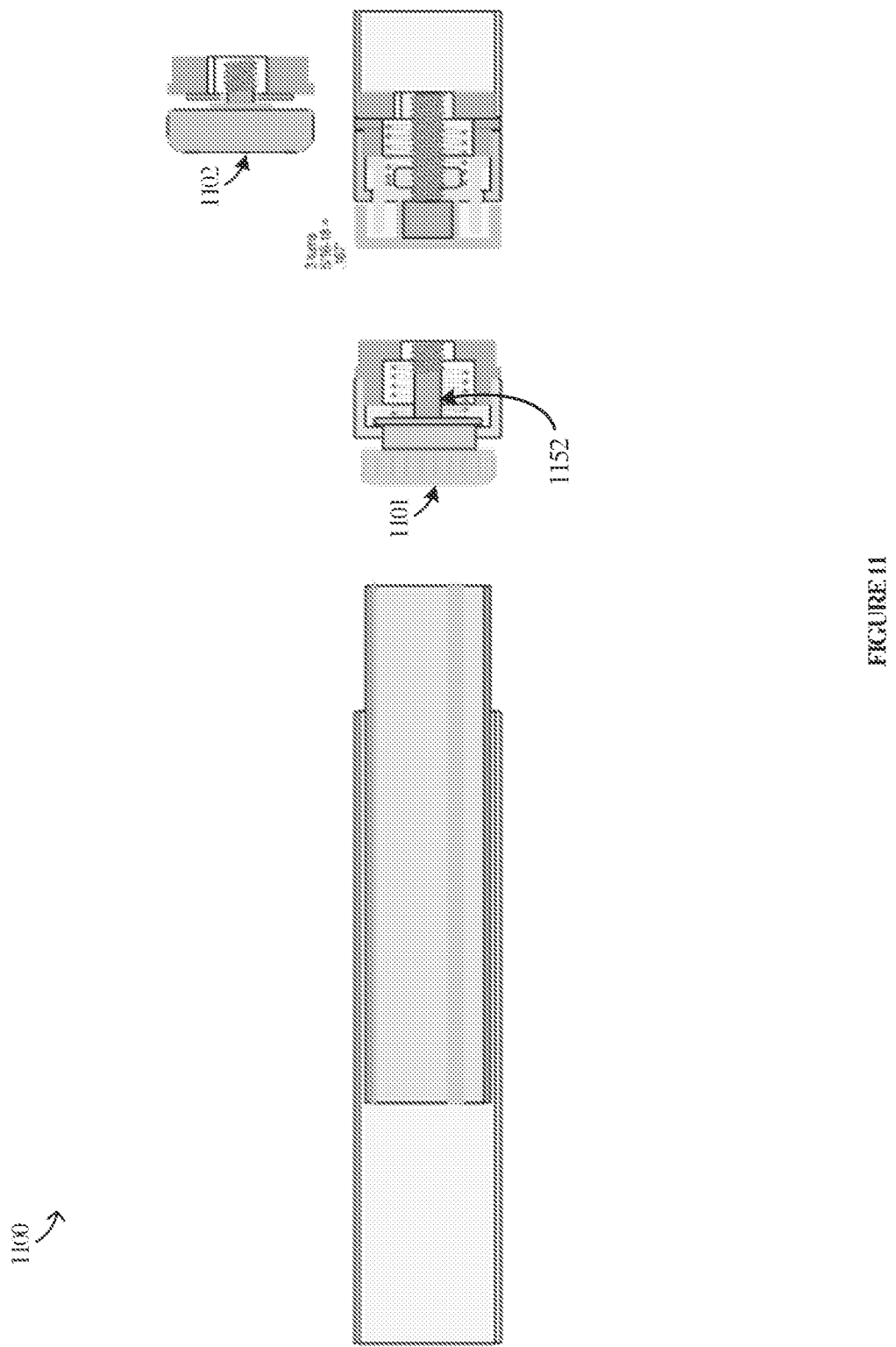
FIG. 11 illustrates various endcap configurations of a squirrel-proof bird feeder in an implementation.

FIG. 11 illustrates different endcap implementations for which endcap 514 of FIG. 5 is representative. In FIG. 11, rod 1152 screws into captive endcap 1101 or noncaptive endcap 1102 to secure the spring mechanism in place within the interior cylinder of the seed container. In an implementation, captive endcap 1101 allows the user to unscrew the spring mechanism from the system while the endcap remains captured inside the system, preventing the user from losing the endcap. In another implementation, noncaptive endcap 1102 detaches from the bird feeder completely. Both implementations allow the user to remove the spring mechanism from the bird feeder which enables easy access to the bottom of the seed container.

Figure 12:
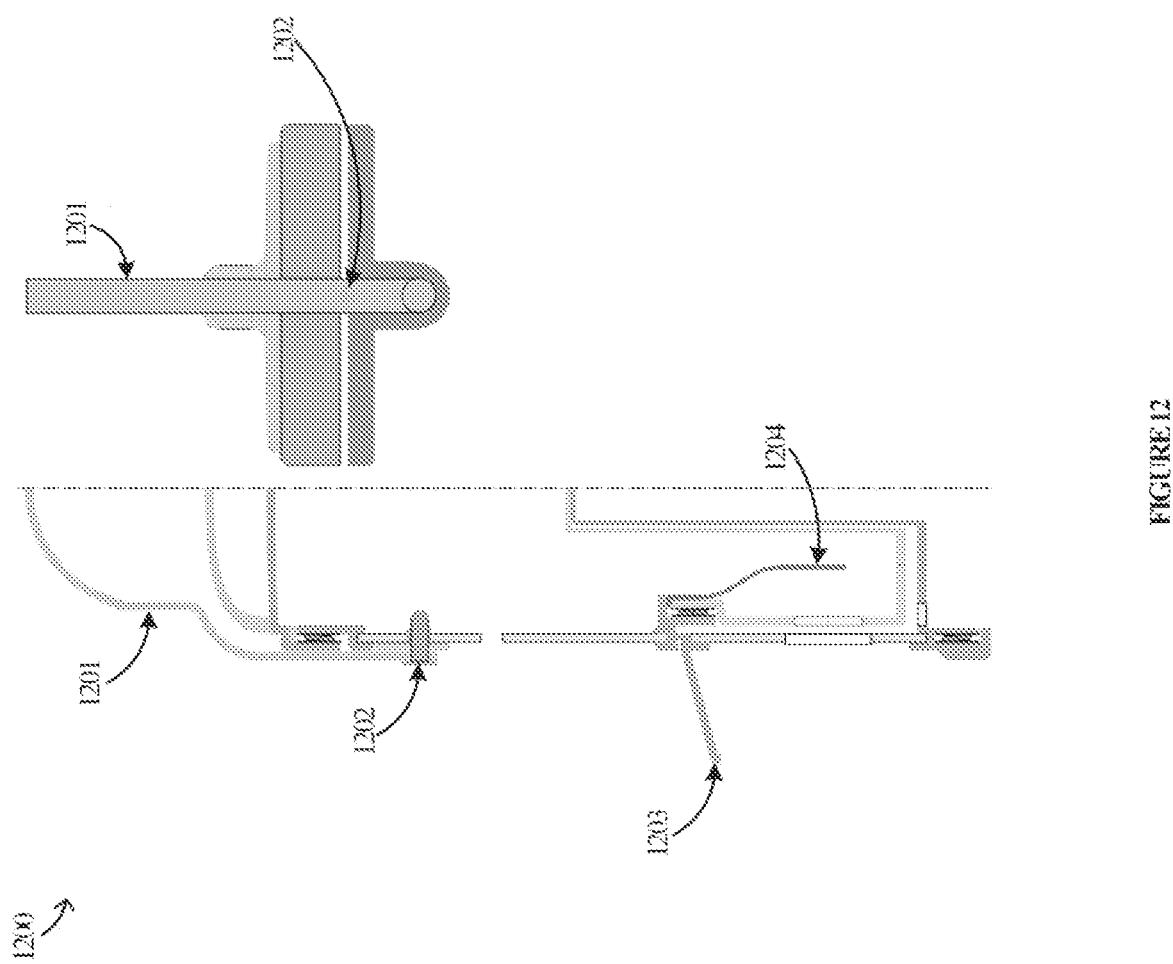
FIG. 12 illustrates the internal component layout of a squirrel-proof bird feeder with a spring shutter mechanism in an implementation.

FIG. 12 illustrates component layout 1200 of a squirrel-proof bird feeder with a spring shutter mechanism in an implementation. Component layout 1200 comprises adjustable handle 1201 wherein the system uses a click-stop implemented by latch 1202 which engages when handle 1201 is in the vertical position. Component layout 1200 further comprises awning 1203 which protects the bird feed from precipitation. Component layout 1200 further comprises seed guard 1204 that is attached to the internal cylinder of the bird feeder. Seed guard 1204 prevents the weight of the bird seed from pushing the seed out of the seed ports.

Figure 13:
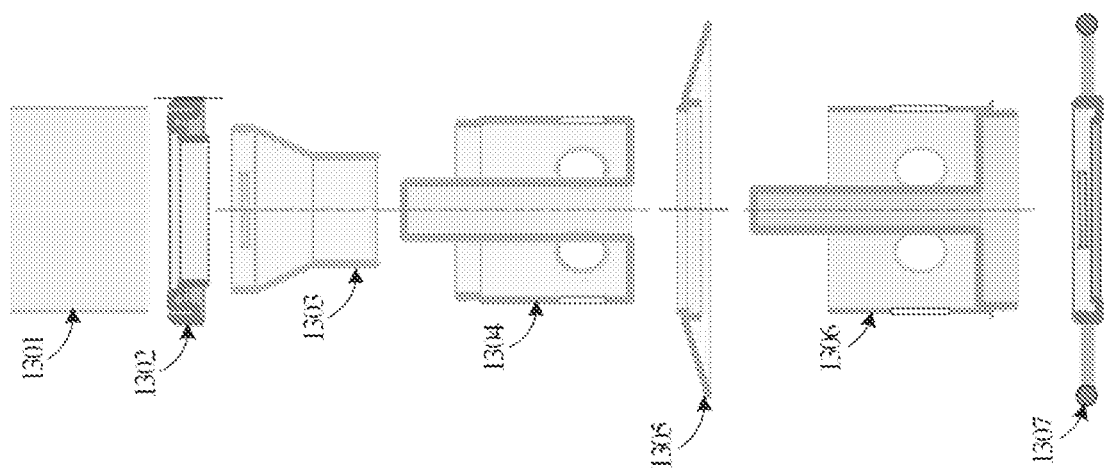
FIG. 13 illustrates an exploded view of a squirrel-proof bird feeder in an implementation.

FIG. 13 illustrates an exploded view 1300 of squirrel-proof bird feeder in an implementation. In view 1300, seed container 1301 attaches to bottom section 1304 via flange 1302. Seed guard 1303 attaches to flange 1302 and is positioned within bottom section 1304. Awning 1305 attaches to flange 1302 and is positioned above the seed ports of bottom section 1304 and access ports of shutter mechanism 1306. Shutter mechanism 1306 encases bottom section 1304, held in position with a spring mechanism (not shown) until sufficient downward force causes shutter mechanism 1306 to drop down and block access to the bird seed. Perch 1307 attaches to the exterior of shutter mechanism 1306 so that if a squirrel or other predator grabs onto the perch to get to the bird seed, this will cause shutter mechanism to drop down and block access to the seed.

Figure 14:
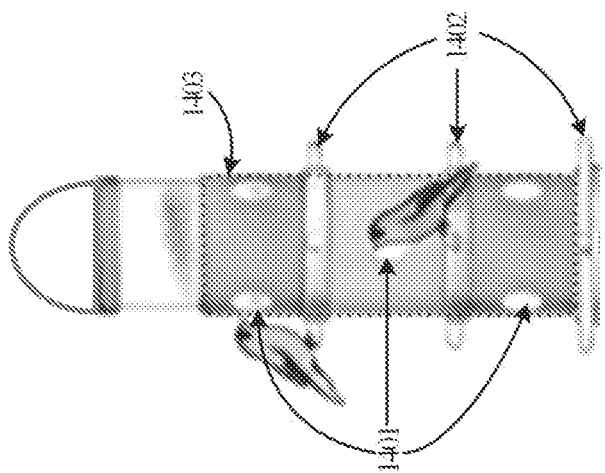
FIG. 14 illustrates a squirrel-proof birdfeeder with multiple levels for seed port access in an implementation.

FIG. 14 illustrates squirrel-proof bird feeder 1400 wherein the bird feeder contains multiple levels to maximize the access to the contents within the feeder. For depiction purposes access ports 1401 on spring-rigged extended shutter 1403 are arranged on three levels, but other implementations may contain more or fewer levels. In an implementation, access ports 1401 are positioned such that the ports are misaligned (i.e., out of vertical alignment) from one level to the next—the ports of the top level are misaligned with those of the middle level, etc. In between the levels are perches 1402, which are attached to extended shutter 1403 employing the same spring-rigged mechanism as the earlier described implementations, such as in birdfeeder 400 of FIG. 4. In some implementations, extended shutter 1403 is made of a durable clear material such as Lexan® so the birds can see the bird feed in the feeder.

Figure 15:
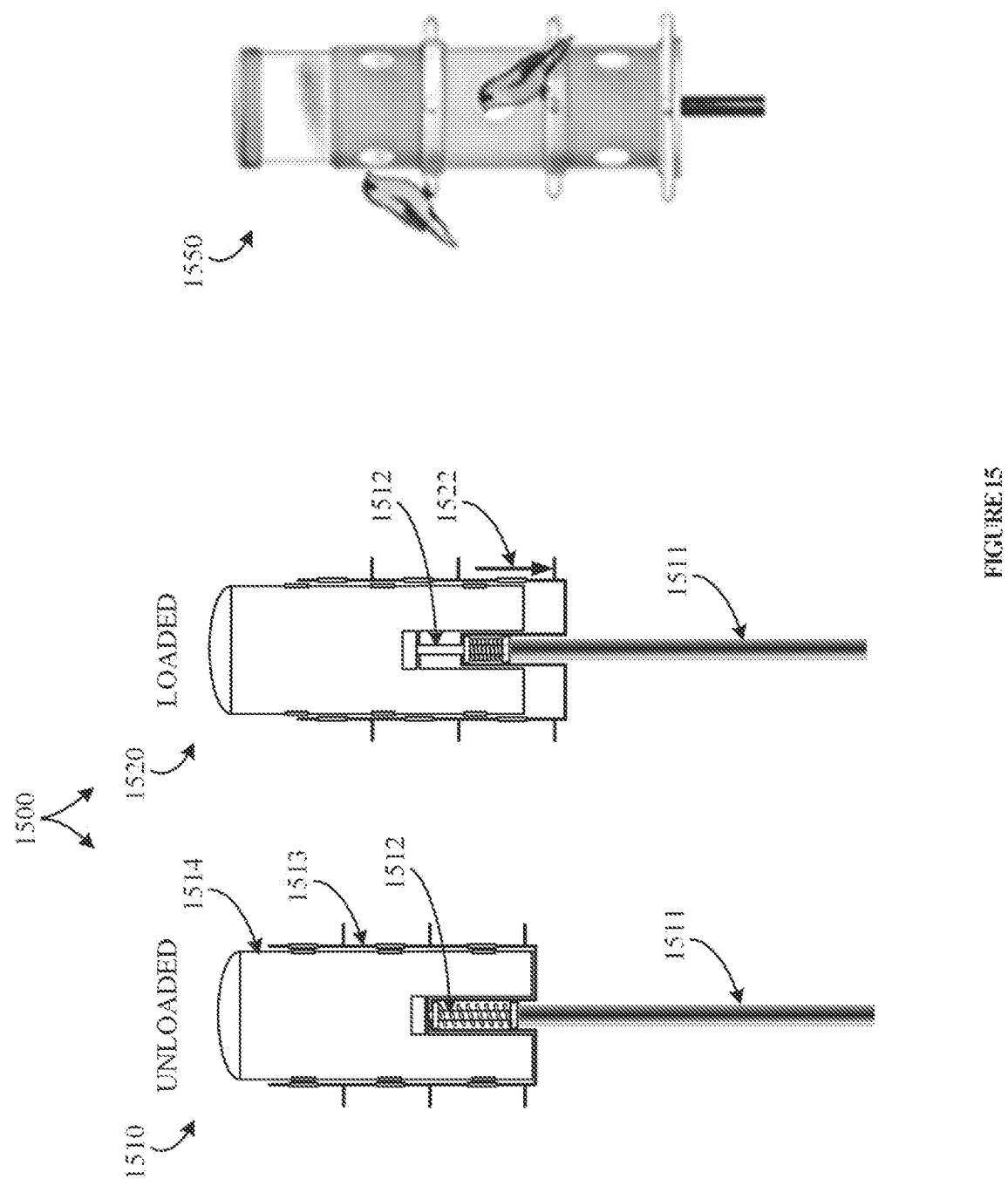

FIG. 15 illustrates operational configurations of a multi-level squirrel-proof birdfeeder 1500 in a pole-mounted implementation. Pole 1511 attaches to rod 1512 of the spring mechanism. Shutter device 1513 can move up and down relative to seed container 1514 but is held up in unloaded configuration 1510 by the spring mechanism so that the seed ports and access ports are aligned. When subjected to downward force 1522 sufficient to overcome the spring tension of the spring mechanism, shutter device 1513 drops down relative to seed container 1514 and blocks access to the seed ports of seed container 1514, as illustrated by loaded configuration 1520. Birdfeeder 1550 is an external view of a multi-level pole-mounted birdfeeder in an implementation. It may be appreciated that implementations of a pole-mounted birdfeeder such as birdfeeder 1500 can comprise one, two, three, or more levels, as described above regarding birdfeeder 1400.

Figure 16:
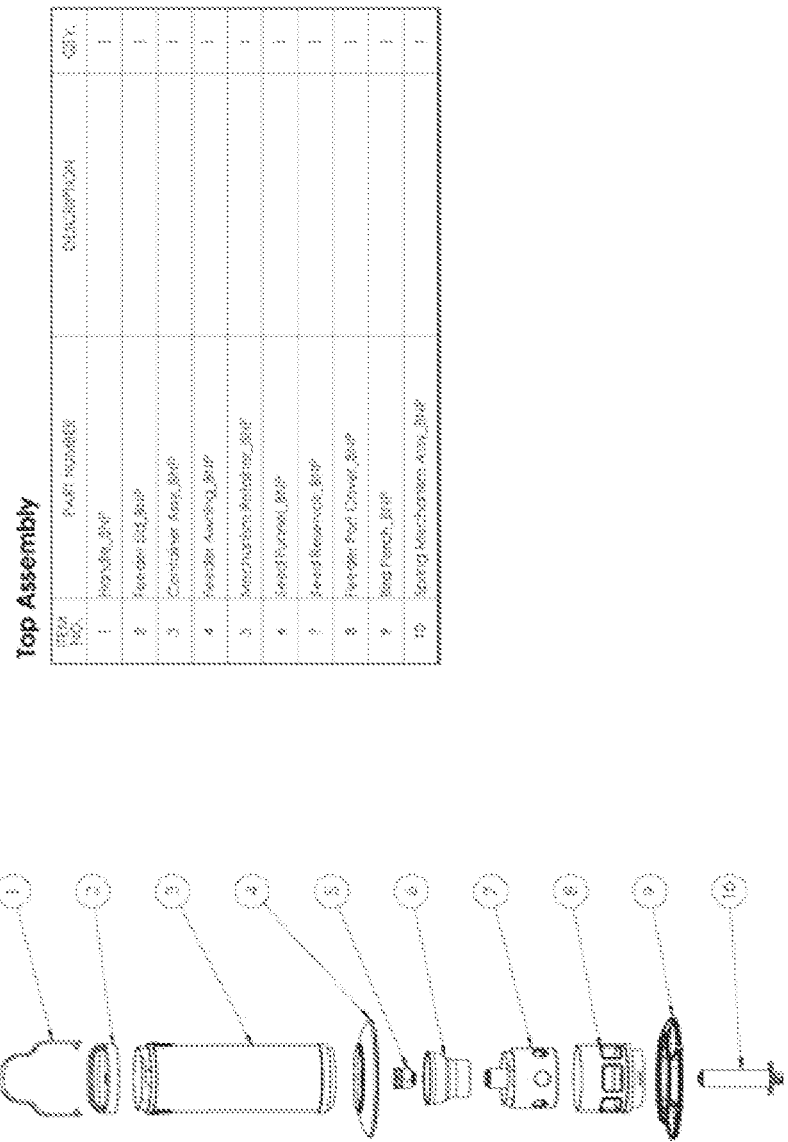
FIG. 16 illustrates an exploded view of a squirrel-proof bird feeder in an implementation.
Figure 17:
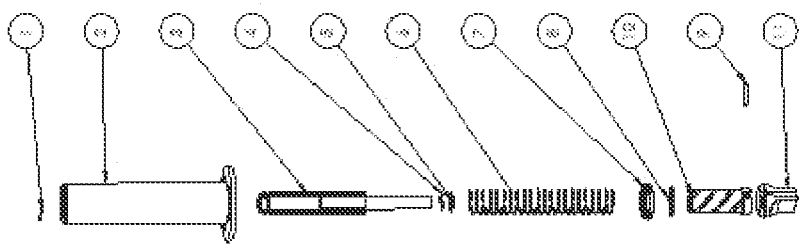
FIG. 17 illustrates an exploded view of a spring assembly of a squirrel-proof bird feeder in an implementation.
Figure 18:
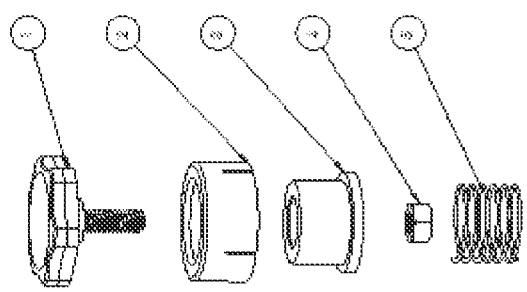
FIG. 18 illustrates an exploded view of a retainer mechanism of a spring assembly of a squirrel-proof bird feeder.
Figure 19:
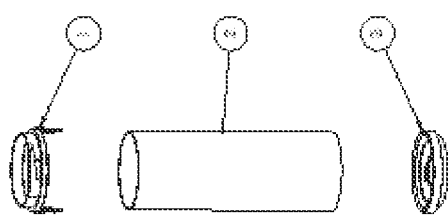
FIG. 19 illustrates a seed container assembly of a squirrel-proof bird feeder.

FIGS. 16-19 illustrates implementations aspects of a squirrel-proof bird feeder according to the technology disclosed herein. FIG. 16 illustrates an exploded view of a squirrel-proof bird feeder in an implementation. FIG. 17 illustrates an exploded view of a spring assembly of a squirrel-proof bird feeder in an implementation. FIG. 18 illustrates an exploded view of a retainer mechanism of a spring assembly of a squirrel-proof bird feeder. FIG. 19 illustrates a seed container assembly of a squirrel-proof bird feeder.

Figure 20:
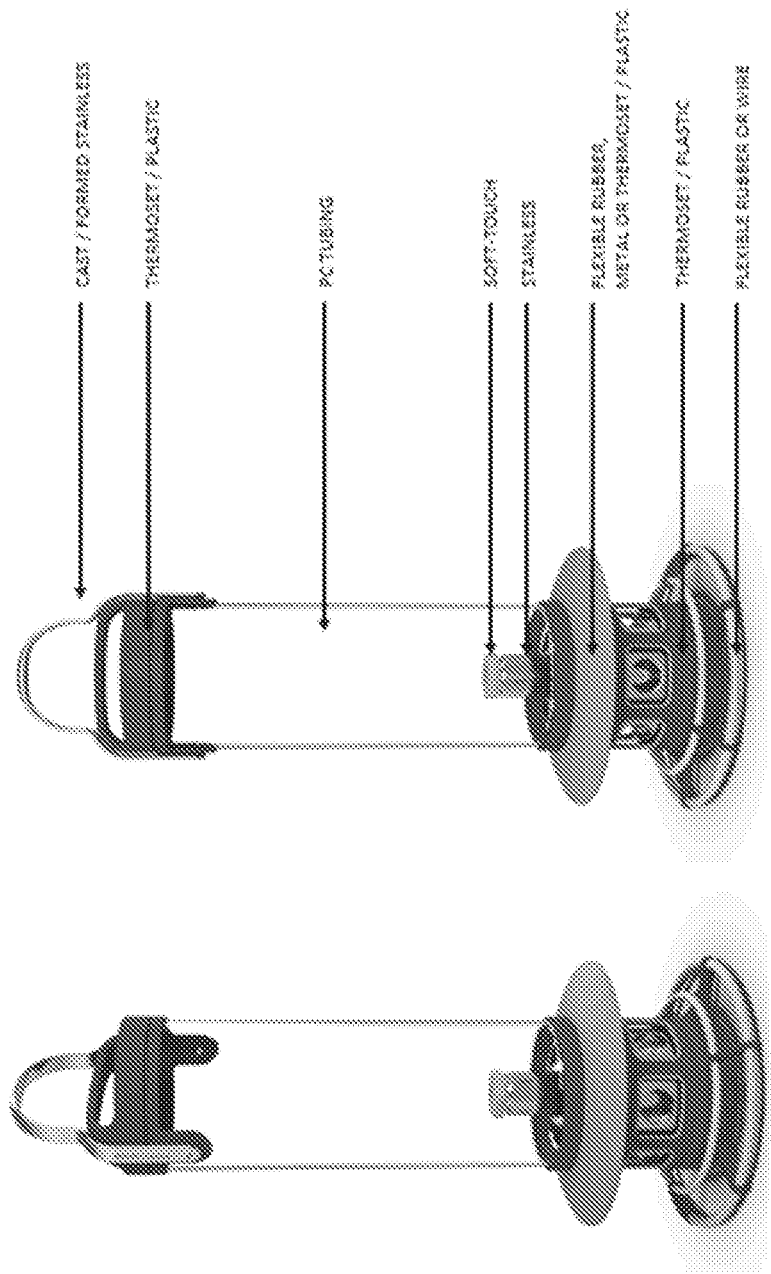
FIG. 20 illustrates implementations of a squirrel-proof bird feeder describing materials used for various components.

FIG. 20 illustrates implementations of a squirrel-proof bird feeder describing materials used for various components.

Figure 21:
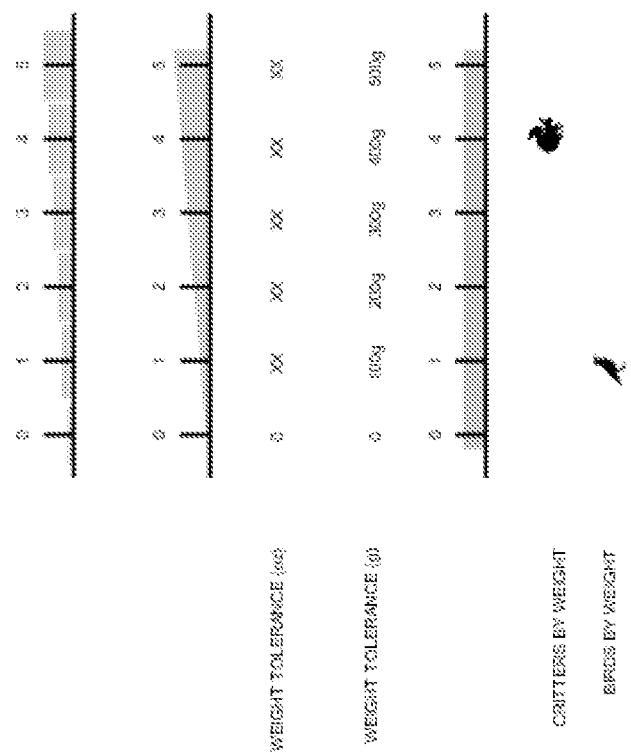
FIG. 21 illustrates exemplary weight tolerances for a spring assembly of a squirrel-proof bird feeder.

FIG. 21 illustrates exemplary weight tolerances for a spring assembly of a squirrel-proof bird feeder, such as spring assembly 450 of FIG. 4.

Figure 22:
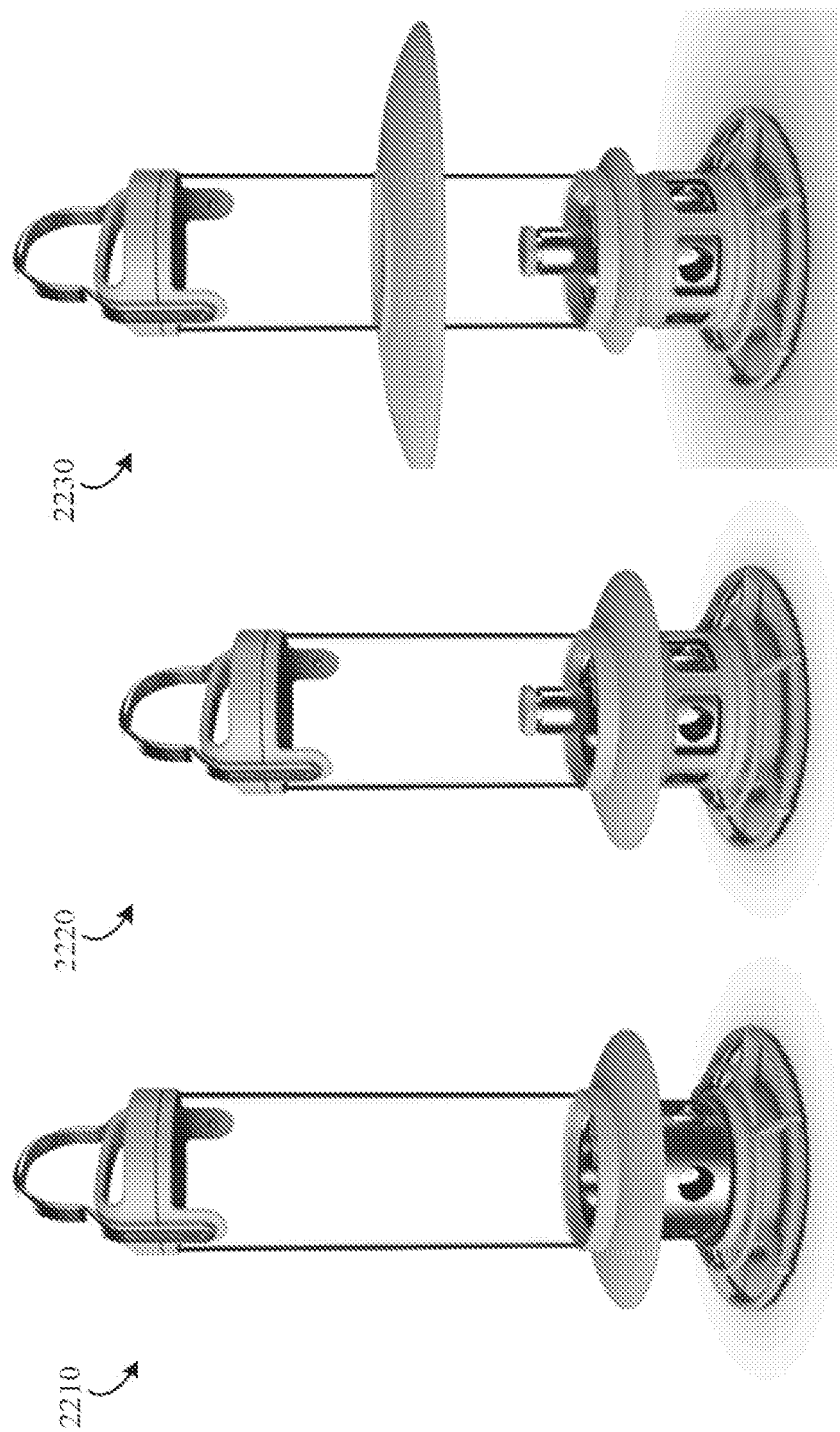
FIG. 22 illustrates implementations of a squirrel-proof bird feeder.

FIG. 22 illustrates implementations of a squirrel-proof bird feeder. Bird feeder 2210 illustrates a squirrel-proof bird feeder with the spring assembly removed and the shutter fixed in a position which allows the bird feed to be accessible (i.e., access ports aligned with seed ports). Bird feeder 2220 illustrates a squirrel-proof bird feeder with a smaller seed container. Bird feeder 2230 illustrates a squirrel-proof bird feeder with a larger outer awning which can be positioned at different heights on the seed container.

Figure 23:
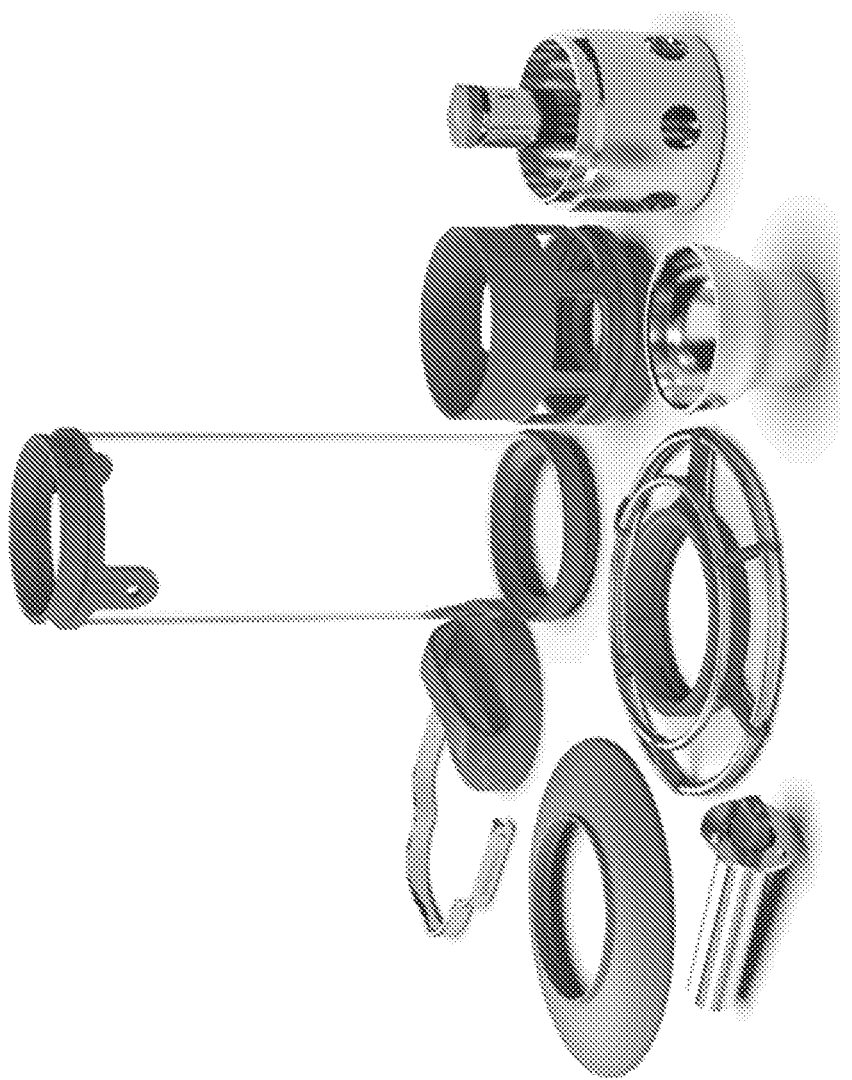
FIG. 23 illustrates components of a squirrel-proof bird feeder in an implementation.

FIG. 23 illustrates components of a squirrel-proof bird feeder in an implementation.

To summarize, this technology provides the devices, system, and method for feeding birds while denying access to the bird food by squirrels, rodents, and other pests. In an implementation, a spring mechanism is secured to the bottom of the seed container, allowing for substantially more containment volume. In an implementation, the force which triggers blocking access to the bird food is adjusted in discrete, quantifiable increments. In an implementation, the force which triggers blocking access to the bird feed is constant so that the bird feed is either fully accessible or completely blocked (i.e., the ports through which food is accessed are not partially blocked).

While this technology has been described in terms of several implementations, there are alterations, modifications, permutations, and substitute equivalents which fall within the scope of this technology. Although subsection titles have been provided to aid in the description of the technology, these titles are merely illustrative and are not intended to limit the scope of the technology.

It should also be noted that there are numerous alternative ways of implementing the methods and apparatuses of the technology. It is therefore intended that the following appended claims be interpreted as including all such alterations, modifications, permutations, and substitute equivalents as fall within the true spirit and scope of the technology.

The invention claimed is:

1. A bird feeder comprising:
   a seed container comprising a sidewall, a top end, and an enclosed bottom end,
   wherein the sidewall forms a cylindrical surface and comprises one or more seed ports,
   wherein the top end is open, and
   wherein the enclosed bottom end comprises a first cylinder extending upward a limited distance into the seed container, the first cylinder further comprising a top surface; and
   a shutter device positioned beneath the enclosed bottom end, wherein the shutter device moves relative to the seed container and wherein the shutter device comprises:
   a base,
   a sleeve extending upward from an edge of the base and enclosing a bottom portion of the seed container, the sleeve further comprising one or more access ports, wherein the access ports are aligned with the seed ports, a spring housing comprising a second cylinder centered on the base and extending upward into the first cylinder and a top surface further comprising a hole, and a spring mechanism within the spring housing wherein the spring mechanism is fixedly attached to the top surface of the first cylinder, wherein the spring mechanism comprises a spring, and wherein the spring causes the spring mechanism to push the shutter device up against the enclosed bottom end of the seed container, and wherein the shutter device slides down to a position below the seed container when a downward force is applied to the shutter device sufficient to overcome a spring force of the spring.

2. The bird feeder of claim 1, wherein the spring mechanism further comprises a rod and a tension adjustment knob rotatably attached to the enclosed bottom end of the seed container and wherein turning the tension adjustment knob adjusts the spring force of the spring in discrete increments.

3. The bird feeder of claim 1, wherein the shutter device further comprises a perch attached to an exterior of the sleeve, such that when the downward force is applied to the perch, the spring mechanism is depressed.

4. The bird feeder of claim 1, further comprising a handle attached to the seed container.

5. The bird feeder of claim 1, wherein the bird feeder is mounted atop a pole, wherein the pole attaches to the spring mechanism.

6. The bird feeder of claim 1, wherein a cross-sectional shape of the seed container is hexagonal.

7. A method of operating a bird feeder, the bird feeder comprising:
a seed container comprising a sidewall, a top end, and an enclosed bottom end,
wherein the sidewall forms a cylindrical surface and comprises one or more seed ports, and
wherein the top end is open, and
wherein the enclosed bottom end comprises a first cylinder extending upward a limited distance into the seed container, the first cylinder further comprising a top surface; and
a shutter device positioned beneath the enclosed bottom end, wherein the shutter device moves relative to the seed container and wherein the shutter device comprises:
a base,
a sleeve extending upward from an edge of the base and enclosing a bottom portion of the seed container, the sleeve further comprising one or more access ports, wherein the access ports are aligned with the seed ports,
a spring housing comprising a second cylinder centered on the base and extending upward into the first cylinder and a top surface further comprising a hole, and
a spring mechanism within the spring housing, wherein the spring mechanism is fixedly attached to the top surface of the first cylinder, wherein the spring mechanism comprises a spring, and wherein the spring causes the spring mechanism to push the shutter device up against the enclosed bottom end of the seed container, and wherein the shutter device slides down to a position below the seed container when a downward force is applied to the shutter device sufficient to overcome a spring force of the spring;

and the method comprising:
positioning the shutter device, by the spring mechanism, up against the enclosed bottom end of the seed container such that the access ports of the shutter device are aligned with the seed ports;
applying the downward force to the shutter device, by a squirrel or other predator, sufficient to overcome the spring force of the spring mechanism;
sliding the shutter device downward, by the downward force, wherein the shutter device is positioned a distance below the enclosed bottom end of seed container such that the access ports are not aligned with the seed ports;
repositioning the shutter device, by the spring mechanism, up against the enclosed bottom end of the seed container when the downward force is removed from the shutter device.

8. The method of operating the bird feeder of claim 7, wherein the spring mechanism further comprises a tension adjustment knob rotatably attached to the enclosed bottom end of the seed container and wherein turning the tension adjustment knob adjusts the spring force of the spring in discrete increments.

9. The method of operating the bird feeder of claim 8, the shutter device further comprising at least one perch attached to an exterior of the sleeve, such that when the downward force is applied to the perch, the spring mechanism is depressed.

10. The method of operating the bird feeder of claim 7, further comprising a handle attached to the seed container.

11. The method of operating the bird feeder of claim 7 further comprising a removeable lid that attaches to the top end of the seed container.

12. The method of operating the bird feeder of claim 7, wherein a cross-sectional shape of the seed container is hexagonal.

13. A bird feeder comprising:
a seed container comprising a sidewall, a bottom end, and a top end,
wherein the sidewall forms a cylindrical shape and comprises one or more seed ports, and
wherein the top end is open, and
wherein the bottom end comprises an interior cylinder extending upward a limited distance into the seed container; and
a shutter device positioned beneath the bottom end, wherein the shutter device moves relative to the seed container and wherein the shutter device comprises:
a base,
a sleeve extending upward from an edge of the base and enclosing a bottom portion of the seed container, the sleeve further comprising one or more access ports, wherein the access ports are aligned with the seed ports,
a spring housing, wherein the spring housing is centered on the base and extends upward into the interior cylinder and has a top surface further comprising a hole, and
a spring mechanism within the spring housing, wherein the spring mechanism further comprises at least:
a spring, wherein the spring is compressed within the spring mechanism, and
a rod which extends upward from the spring mechanism, passes through the hole in the spring housing, and is fixedly attached to the interior cylinder, such that when a downward force is applied to the shutter device, the spring mechanism is depressed which causes the shutter device to move downward relative to the rod, which causes the spring to be further compressed, and which causes the access ports to move out of alignment with the seed ports, wherein the rod remains stationary relative to the seed container as the shutter device moves downward.

14. The bird feeder of claim 13, wherein the spring mechanism further comprises a tension adjustment knob rotatably attached to the bottom end of the rod, wherein turning the tension adjustment knob adjusts a spring force of the spring in discrete increments.

15. The bird feeder of claim 13, wherein the shutter device further comprises at least one perch attached to an exterior surface of the sleeve, such that when the downward force is applied to the perch, the spring mechanism is depressed.

16. The bird feeder of claim 13, wherein the sleeve comprises two or more rows of access ports and two or more rows of perches positioned between the rows of access ports and wherein the seed container comprises two or more rows of seed ports such that the seed ports are aligned with the two or more rows of access ports.

17. The bird feeder of claim 1, wherein the seed container is made from a transparent material.

18. The bird feeder of claim 1, wherein a weight tolerance for the spring mechanism comprises a value less than or equal to 500 grams.

19. The method of operating the bird feeder of claim 7, wherein the seed container is made from a transparent material.

20. The method of operating the bird feeder of claim 7, wherein a weight tolerance for the spring mechanism comprises a value less than or equal to 500 grams.

* * * * *